Feb. 23, 1932.  S. W. McCUNE, JR  1,846,220
PROCESS AND APPARATUS FOR MAKING ROSIN SIZE EMULSIONS
Filed Aug. 1, 1928    2 Sheets-Sheet 1

Inventor:
Samuel W. McCune Jr.
by: Charles W. Hill

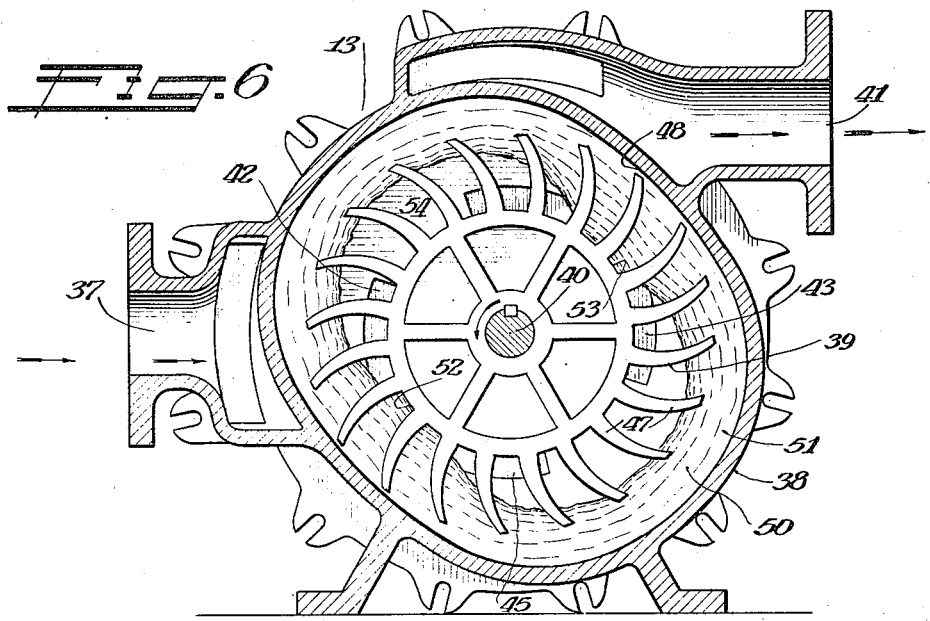
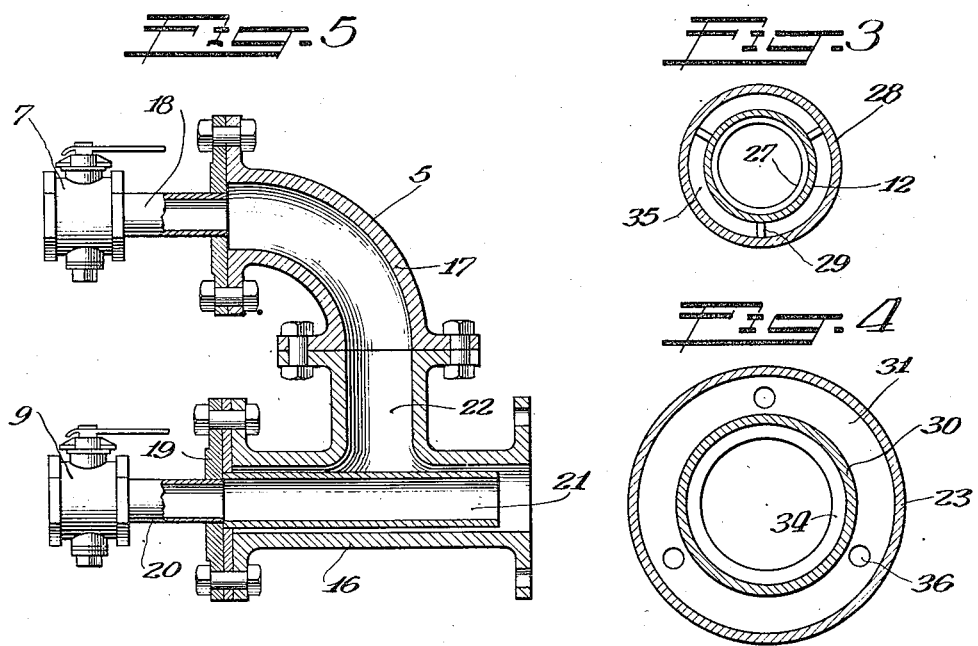

Patented Feb. 23, 1932

1,846,220

UNITED STATES PATENT OFFICE

SAMUEL W. McCUNE, JR., OF OAK CREEK, WISCONSIN, ASSIGNOR, BY MESNE ASSIGNMENTS, TO NEWPORT INDUSTRIES, INC., A CORPORATION OF DELAWARE

PROCESS AND APPARATUS FOR MAKING ROSIN SIZE EMULSIONS

Application filed August 1, 1928. Serial No. 296,845.

This invention relates to a process and an apparatus for making rosin size emulsions.

In the manufacture of rosin size emulsions, such as are commonly used in the sizing of paper, it is customary to pass a mixture of hot water and heavy rosin size under pressure through a mixing or emulsifying device of a type wherein a runner or set of blades is adapted to be revolved by the fluid pressure of the size mixture. The size emulsion thus formed is then passed into a tank, from which it is usually pumped to individual measuring tanks mounted above the beaters.

One of the difficulties most frequently experienced in making size emulsions using emulsifying devices of this type is that the runner or blades do not rotate at a constant speed, owing to variations in the steam or the hot water pressure and to changes in the density of the heavy size feeding to the device. As a result of the variations in speed, the quality of the size emulsion varies accordingly, and frequently unemulsified size gets into the system. Occasionally, also, the openings and interior orifices of the emulsifying device become clogged up with heavy size or foreign matter.

It is, therefore, an object of this invention to provide an apparatus for preparing rosin size emulsions wherein the moving parts of the emulsifier are driven at a constant speed from an external source, thus rendering it independent of fluctuations in fluid pressure.

It is a further object of this invention to provide a homogenizer for producing rosin size emulsions that is unlikely to become clogged and that serves also in the place of a pump to distribute the size emulsion under a considerable discharge head.

Other and further important objects of this invention will be apparent from the disclosures in the specification and the accompanying drawings.

This invention (in a preferred form) is illustrated in the drawings and hereinafter more fully described.

On the drawings:

Figure 3 is an enlarged sectional view taken on line III—III of Figure 2;

Figure 4 is an enlarged sectional view taken on line IV—IV of Figure 2;

Figure 5 is an enlarged sectional view of a mixing T with parts in elevation; and Figure 6 is a sectional view of the emulsifying device.

Figure 1:
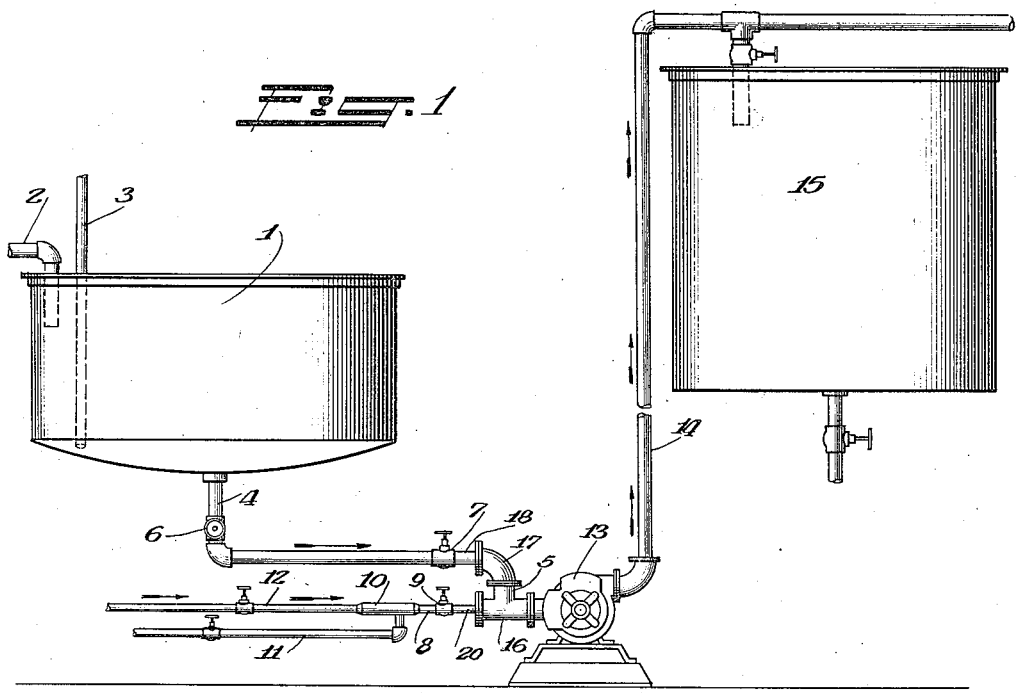
Figure 1 is a broken elevational view of a system for making rosin size emulsions.
Figure 2:
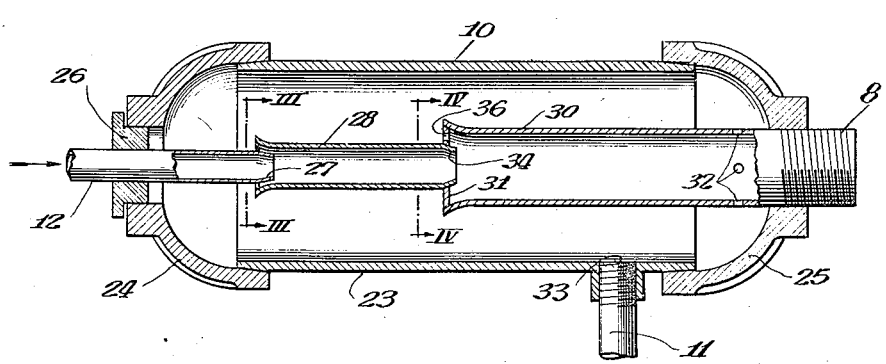
Figure 2 is an enlarged sectional view of a water heating device.

The reference numeral 1 indicates a tank for heating heavy rosin size and provided with an inlet 2 and a steam pipe 3 for connection with coils (not shown) in the bottom of the tank. The rosin size at this point will average about 60% total solid matter.

A pipe 4 conducts the rosin size from the bottom of said tank 1 to a mixing T 5. A valve 6 is positioned in the pipe 4 closely adjacent the bottom of the tank 1 and a second valve or cock 7 is positioned also in the line 4 ahead of the mixing T 5. Said mixing T 5 is also connected through a pipe 8 controlled by a cock 9 to a heater 10 supplied with water and steam through the valve controlled lines 11 and 12, respectively.

From the mixing T 5 the mixture of hot water and rosin size passes into an emulsifying device, indicated as a whole by the reference numeral 13, and from thence through a pipe 14 for distribution into one or more tanks 15. From the tank 15 the rosin size emulsion is ordinarily allowed to flow by gravity into measuring tanks positioned above the beaters, where the size is to be used in the manufacture of paper.

The mixing T 5, as best shown in Fig. 5, comprises a flanged T fitting 16 having a side opening 22 for the rosin size, connected by means of an elbow 17 to a nipple 18 in the pipe line 4. Said T 16 is also connected by means of a flange 19 to a nipple 20 in the hot water pipe line 8. A nozzle 21 of smaller diameter than the inside diameter of the T 16 is positioned in said T to form a continuation of the nipple 20 and extends beyond the rosin size inlet 22 in such a manner as to create a slight suction in said inlet 22 to facilitate the flow of rosin size into the mixing T.

The heater 10 comprises a cylindrical casing 23 having rounded, centrally apertured ends 24 and 25 secured thereto. The steam line 12 passes through a bushing 26 in said end 24 and terminates in a tapered nozzle 27 within the cylindrical portion 23. A somewhat larger diameter, straight nipple 28, having also a tapered nozzle 34 at one end, is mounted at its other end upon the nozzle 27 of said pipe 12 by means of lugs 29. The nozzle 34 is supported from an inner extension 30 of the pipe 8 by means of a perforated flange 31. Said extended end 30 of the pipe 8 is also provided with perforations 32 for a purpose that will later appear.

Water from the pipe 11 enters the side of the cylindrical casing 23 as at 33 and fills the interior of said casing. The steam entering through the pipe 12 in passing through the series of reduced nozzles 27 and 34 into the successively larger diameter nipple 28 and pipe 30, creates sufficient suction to draw the hot water through the openings 35 provided between the lugs 29 and the perforations 36 in the flange 31 as well as the perforations 32. There results an intimate mixing of the water with the steam and consequent formation of hot water.

The hot water passes from the heater 10 through the cock 9 and nipple 20 into the nozzle 21 in the T 16 as above described. The mixture of heavy rosin size and hot water when passes from the T 16 into the inlet port 37 of the emulsifier 13 (Fig. 6). Said emulsifier 13 is preferably of a type commonly used as an air compressor and also for the purpose of handling air and entrained liquids. The device 13 comprises an elliptical shaped casing 38 having mounted therein an impeller 39 keyed to a shaft 40 and adapted to be driven from an external source of power, such as a motor (not shown). Said casing 38 is provided with a discharge port 41 connected to the pipe 14 and with interior offset outlet ports 42 and 43 communicating with the interior of said casing and with the discharge 41. Similar interior offset inlet ports 44 and 45 communicate with the intake 37, these ports being spaced radially and alternating with the outlet ports 42 and 43 in a well-known manner. The impeller 39 comprises a cylindrical hub 46, and integrally formed, radially extending curved blades 47. Said blades 47, at the narrower portion of the elliptical casing 38, afford but slight clearance as at 48 but a considerably larger clearance 50 at the ends of said casing. Accordingly, the fluid 51, which remains in the casing 38 as long as the impeller is being driven, contacts the outer surface of the hub 46 at opposite points 52 and 53 but draws away at the ends of said casing due to the centrifugal action of the impeller, to provide partial voids 54 and 55. Accordingly, the mixture of hot water and rosin size entering the interior of the casing through the inlet passages 44 and 45 is drawn into these partial voids 54 and 55 and then gradually forced out by the continued revolution of the blades 47 through the outlet passages 42 and 43 into the discharge 41. Obviously, a considerable amount of slippage occurs and a great portion of the rosin size mixture is recirculated. On this account, the rosin size is finely broken up and dispersed to form a water emulsion which will not separate out even on long standing. The emulsifying device 13 at the same time serves to discharge the rosin size emulsion under sufficient head to raise the emulsion into elevated tanks such as the tank 15. The emulsifying device 13 thus takes the place of a centrifugal pump, which would otherwise be necessary in most installations as formerly arranged.

It will be understood that other specific forms of emulsifying devices may be used provided they afford sufficient radial clearance between the impeller and interior surface of the casing to cause slippage and recirculation of the fluid. One of the important features of my invention is that the impeller is driven at a constant speed, thereby eliminating the variations in the quality of the rosin size emulsion formerly produced by emulsifiers operating by the pressure of the fluid feeding into same. A speed of say 1200 R. P. M. has been found very satisfactory for the operation of an emulsifier such as above described.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination with apparatus for making rosin size, a device for forming a size emulsion with water and pumping the emulsion so formed, comprising an elliptical casing having inlet and outlet ports and an impeller within said casing providing large clearances, thus giving a considerable amount of slippage with resultant recirculation within the casing, and external means for rotating said impeller.

2. The process of making rosin size emulsions, which comprises homogenizing a mixture of heavy rosin size and hot water by subjecting the mixture to centrifugal action while confined temporarily within an elliptical shaped space.

3. Apparatus for making rosin size emulsions, comprising a container for a heavy rosin size, means for conducting the size into preliminary mixing relation with hot water and a dispersing device adapted to receive said hot water and size mixture and to form therefrom a homogeneous size emulsion said device being of a type ordinarily employed as an air compressor and having an encased rotary impeller with circumferentially alternating large and small radial clearances.

In testimony whereof I have hereunto subscribed my name at Carrollville, Milwaukee County, Wisconsin.

SAMUEL W. McCUNE, Jr.